Sept. 10, 1940.   G. M. GARRISON ET AL   2,213,959
DIRECTION INDICATING LIGHTS FOR PROFILE TRACERS
Filed Nov. 4, 1938   3 Sheets-Sheet 2

Inventors:
George M. Garrison
Harry S. Allison
Leroy C. G. Huhn
by Ransom K. Davis
Attorney Sept. 10, 1940.　　G. M. GARRISON ET AL　　2,213,959
DIRECTION INDICATING LIGHTS FOR PROFILE TRACERS
Filed Nov. 4, 1938　　3 Sheets-Sheet 3

Inventors
Geo. M. Garrison
Henry S. Allison
Leroy C. G. Huhn
By W. Glenn Jones
Attorney Patented Sept. 10, 1940

2,213,959

UNITED STATES PATENT OFFICE 2,213,959

DIRECTION INDICATING LIGHTS FOR PROFILE TRACERS

George M. Garrison and Leroy C. G. Huhn, Washington, D. C., and Harry S. Allison, Brentwood, Md.

Application November 4, 1938, Serial No. 238,734

2 Claims. (Cl. 90—13.5)

(Granted under the act of March 3, 1883, as amended April 30, 1928; 370 O. G. 757)

This invention relates to a system of lights for visually indicating to the operator of an automatic metal-cutting machine tool the direction of movement of the tracer-point relative to the model and the accuracy with which the tracer is following the outline of the model.

The invention is particularly adapted for use in connection with a Keller automatic metal-cutting machine. On these machines a tracer-bar is mounted for wobbling movement about a central ball and socket joint. One end of the tracer-bar carries a tracer-point which follows the model. The other end is provided with contacts selectively closed by manual positioning of a selector ring. With the selector ring properly positioned the closed contacts complete electro-magnetic clutch circuits which drive the tracer point along and against the profile of the model. Too solid contact of the tracer-point with the model opens one of the contacts and stops the feed in that direction. If the selector ring is not properly positioned the tracer point will be driven at a rate of speed lower than the most efficient one, or it may be driven in a direction which will cause it to lose contact with the model and thus make an incorrect cut on the work.

Previously the operator was guided in his selection of the proper position for the selector ring only by watching the tracer point. If the selector ring was properly positioned the tracer point would remain in contact with the model. If only approximately correctly positioned it would follow approximately the outline of the model but would not maintain continuous contact. If the operator could see that it was not actually in contact with the model he could shift the selector ring slightly to remedy the defect. But on large pieces of work with the model located some distance away from the work it is often difficult for the operator to see the point of contact and an inexperienced operator, even on small work, might easily fail to detect a small inaccuracy, with a resultant loss of time due to the necessity for retracing the cut.

It is one of the objects of the invention to provide a visual means located within plain view of the operator, for indicating the direction of relative movement of the tracer point with respect to the model.

It is a further object of the invention to provide a visual means for indicating whether or not the tracer point is moving in the direction which will produce the most rapid and efficient movement of the tracer point around the model.

It is a still further object of this invention to provide a means for visually informing the operator when the tracer point is not in contact with the model.

It is another object of the invention to provide a means for indicating visually to the operator when a break occurs in one of the relay circuits used for moving the tracer point with respect to the model.

One form of the invention is shown in the accompanying drawings, in which.

Figure 1:
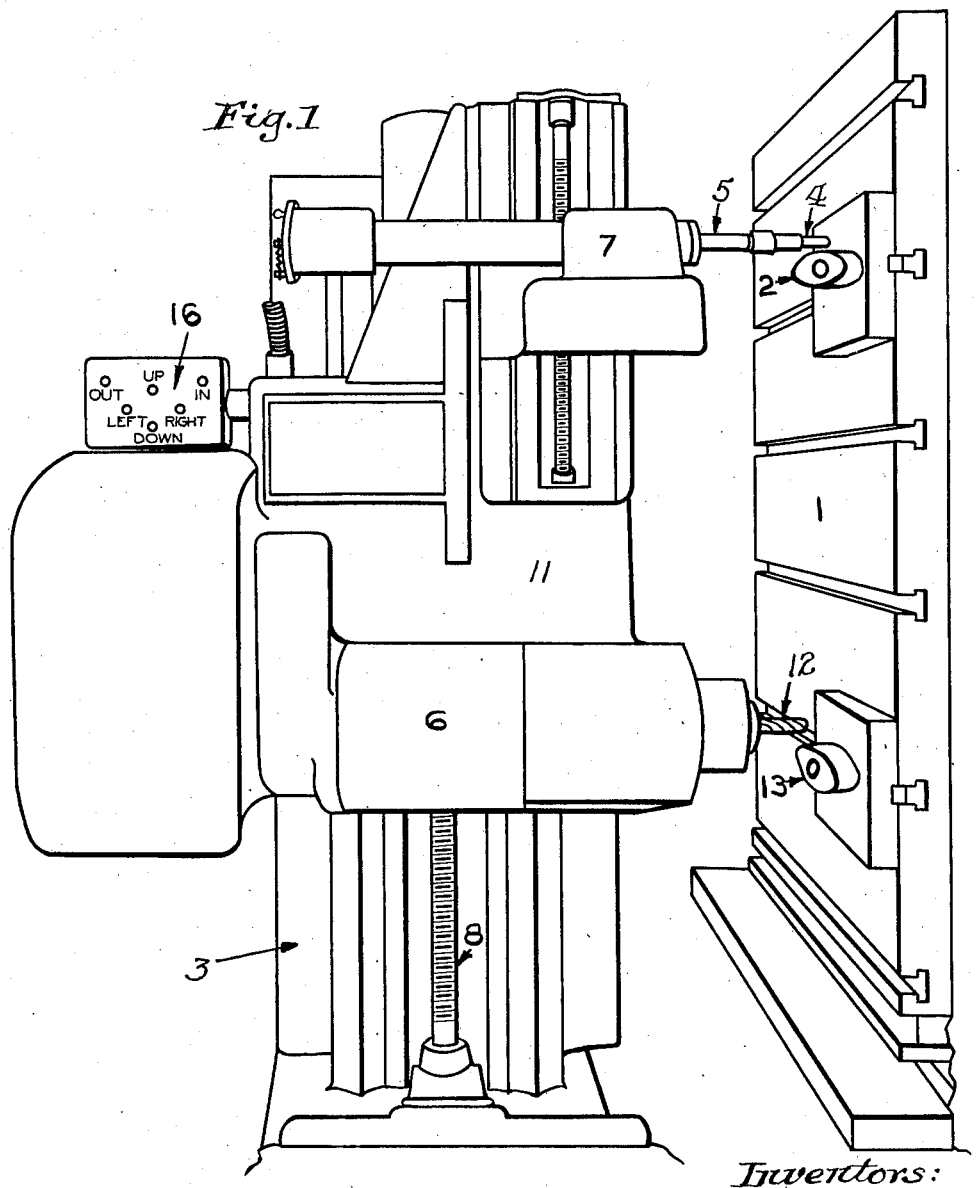
Fig. 1 is a front elevational view, in perspective, of a portion of a Keller automatic metal-cutting machine incorporating the invention.

Referring to Fig. 1, there is shown the main parts of a Keller automatic metal-cutting machine. The base plate 1 has secured thereto the model 2 and the work 1. The column 3 has mounted thereon the saddle 11 which carries the cutter housing 6 and the tracer housing 7. The column is provided with slide-ways upon which the saddle slides in a vertical direction. This movement of the saddle is governed by the vertical feed-screw 8. In the cutter housing is mounted the cutter spindle which terminates in the cutter 12. In the tracer housing is mounted a tracer bar 5 which terminates in a tracer point 4. The base-plate 1 has four feeds with respect to the tracer point, right, left, in and out.

Figure 3:
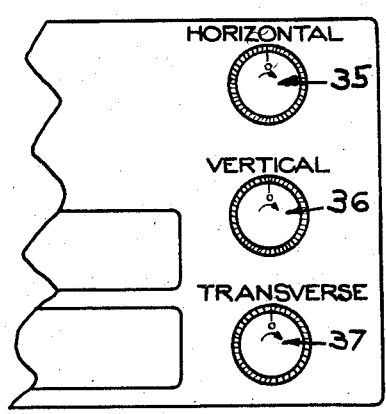
Figures 4, 5:
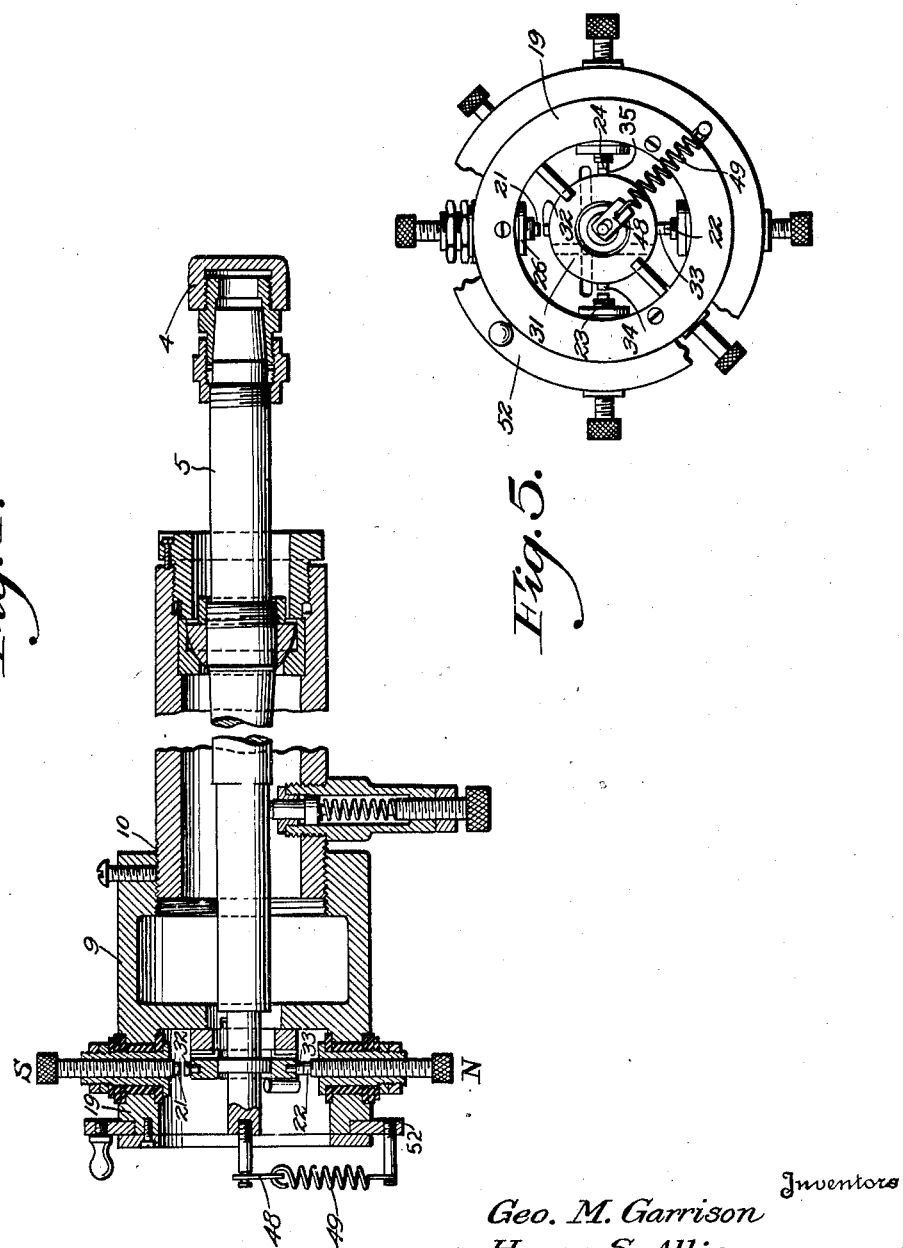

The details of the tracer bar and its associated mechanism by means of which the feeding of the cutter to the work is governed, are shown in Figs. 4 and 5. These figures are copies of Figs. 1 and 3 of Patent No. 1,840,853 to Shaw, issued Jan. 12, 1932. It will be noted that four contact points 21, 22, 23 and 24 are provided in the sleeve 10. These contacts are spaced 90 degrees apart. Corresponding contact points 32, 33, 34 and 35 are carried by a collar or block 31 carried in turn by the tracer bar. These contacts govern the movement of the tracer point 4 with respect to the model in up and down and right and left directions. Rotatably mounted on extension 19 of tracer head 9 is a selector ring 52, which is manually rotatable. At one point on the selector ring is secured one end of a spring 49, the other end of which is secured to a member 48 rotatably mounted on the end of the tracer bar. This spring tends to draw the end of the tracer-bar in the direction of its length and thus close one or two of the contacts. Rotation of the selector ring governs the selection of the contacts to be closed.

Figure 2:
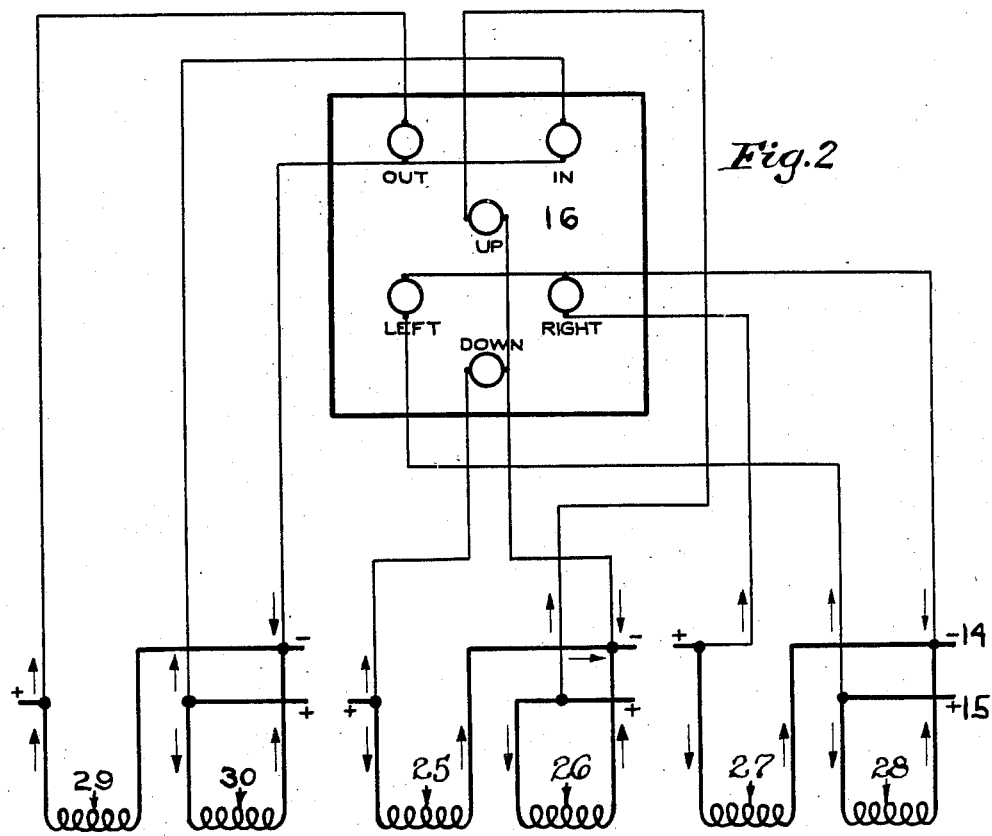
Fig. 2 is a schematic wiring diagram showing the circuits for the indicating lights; and, Fig. 3 is a front elevational view of the control panel of the machine, showing the manually operated dials for controlling the feed screw rheostats.

The invention lies in an arrangement of lights, now to be described, which indicates the direction of movement of the tracer-point relative to the model. The lights are shown in Figs. 1 and 2 of the drawings. They are marked out, in, up, down, left and right. It has been found that ¼ watt, 105–125 volt A. C. and D. C., neon filled lamps form the best type of lamps for this purpose. The lights are mounted in a case 16 having a front made preferably of some black material. The case is located in easy view of the operator. As shown in Fig. 2, 110 volt D. C. supply line 14, 15 is provided for actuating the directional drives of the machine. Six magnet clutch coils 25 to 30 are connected in parallel across this line. Each coil is in circuit with one of the tracer contacts and when the circuit is complete causes the tracer-point to be driven in one of the six directions. Each of the lights is connected in parallel with one of the clutch circuits.

Each of the clutch circuits is normally provided with a push button type switch by means of which the operator may close the circuit at will to drive the tracer point and cutter, with respect to the model and work respectively, in the direction desired. The use of a model and tracer-bar may be dispensed with if desired. Also, if desired, a type of tracer-bar having contacts governing the in and out movements of the tracer-point with respect to a model, as disclosed in Patent No. 2,007,899 to Shaw, issued July 16, 1935, may be provided. But in any event the lights will indicate the direction of relative movement of the cutter with respect to the work.

Fig. 3 shows a portion of the control panel of the machine. The three dials 35, 36 and 37 operate the feed speed rheostats of the various directional drives. Each dial operates by hand in both directions and each controls the speed of two opposite drives. Their use enables the operator to better synchronize the feeds when two drives are operating.

In the operation of the machine there will normally be, for most efficient operation, one dominant and one subordinate directional drive. For example, in contouring work, when the tracer-point must follow a surface making less than a 45° angle with the horizontal and inclined up to the right, the tracer-point should be driven up and to the right. Since the greatest component of the resultant movement is horizontal, the most efficient operation of the machine requires that the point be moved to the right with a continuous motion and up with an intermittent motion.

The operator judges which of the directional movements should be continuous and which should be intermittent by noting the slope of the portion of the model which the tracer-point is next to follow. He can easily see in which of the component directions the greatest amount of travel will take place.

The intermittent motion in the subordinate direction is necessary because of the limitations imposed by practice upon the cutting speeds of the machine. This motion results from the fact that as the tracer-point moves up it comes into forcible contact with the model and the down pressure of the model breaks the up contact at the other end of the tracer-bar, which remains broken until the tracer-point has again moved far enough in the horizontal direction to remove the down pressure. These successive increments of motion are so small that the resulting cut will remain smooth. With the selector ring set to produce the above described motion the light marked "right" will glow steadily while that marked "up" will continuously flicker. This combination of lights informs the operator that the cutting is proceeding in the most efficient manner. If both lights remain continuously lighted the operator will know that the tracer-point is not in contact with the model. If one of the lights fails to burn it indicates that that clutch circuit has been broken. If the lights for both the up and horizontal movements flicker or if neither light lights up, the operator will know, that for the above conditions he has not positioned the selector ring for the most efficient cutting.

An inexperienced operator can, by the use of these lights, quickly become proficient in the operation of the machine, and an experienced operator is enabled by their use to turn out much better work and to eliminate the cost of remaking imperfect cuts and hand finishing erratically cut pieces. By use of the lights work can be given a machined finish in the cutting operation and the necessity for additional finishing operations eliminated.

While the preferred form of our invention has been shown and described, it will be understood that it is not limited to the details of construction shown, for various modifications therein and in the connections and arrangements may be made without departing from the spirit and scope of the invention.

The invention described herein may be manufactured and/or used by or for the Government of the United States of America for governmental purposes without the payment of any royalties thereon or therefor.

We claim:

1. In a machine having a tracer for following the contours of a model and means for simultaneously driving the tracer in a plurality of different directions relative to said model, a separate one of said means being provided for each directional movement; a plurality of visual indicating means, each operatively connected to one of said directional tracer moving means, and so arranged as to give a visual indication when said one of said directional tracer moving means is in operation.

2. In combination with an automatic metal-cutting machine tool having a tracer bar mounted for universal lateral movement about a central pivot and movable by contact of one end thereof with a model, a plurality of spaced circumferentially fixed contacts mounted near the other end of said bar, a corresponding plurality of movable contacts mounted on said end of said bar and adapted upon lateral movement of said end to contact said fixed contacts, electrical circuits connected with said fixed contacts and adapted to be closed when the latter are engaged by the respective movable contacts for controlling the feed of the tracer bar in a corresponding plurality of directions, the spacing of said contacts being such that only two may be closed at one time, a resilient member for urging said movable contacts toward closing on the corresponding fixed contacts, and means for varying the direction of action of said resilient member to predetermine which two of the contacts will be closed thereby; a plurality of visual indicating means each operatively connected to one of said circuits and so arranged as to give a continuous visual indication while its corresponding circuit is closed.

GEORGE M. GARRISON.
LEROY C. G. HUHN.
HARRY S. ALLISON.